United States Patent
Yeh et al.

(10) Patent No.: US 7,236,582 B2
(45) Date of Patent: Jun. 26, 2007

(54) SYSTEM AND METHOD FOR TRANSPARENT CONSOLIDATION OF SWITCHES IN A TELECOMMUNICATIONS NETWORK

(75) Inventors: Hae Shyong Yeh, Plano, TX (US);
Maureen R. O'Toole, Plano, TX (US);
Amir Abdollahi, Plano, TX (US);
Thomas L. Ferguson, Carrollton, TX (US)

(73) Assignee: Alcatel Lucent, Paris (FR)

( * ) Notice: Subject to any disclaimer, the term of this patent is extended or adjusted under 35 U.S.C. 154(b) by 303 days.

(21) Appl. No.: 10/993,775

(22) Filed: Nov. 20, 2004

(65) Prior Publication Data
US 2006/0109972 A1 May 25, 2006

(51) Int. Cl.
*H04M 7/00* (2006.01)
(52) U.S. Cl. .................................... 379/221.1; 379/230
(58) Field of Classification Search ............................... 379/221.08–221.12, 230
See application file for complete search history.

(56) References Cited

U.S. PATENT DOCUMENTS

| 5,048,081 A | * | 9/1991 | Gavaras et al. ............. 379/230 |
| 5,708,702 A | * | 1/1998 | De Paul et al. ........... 379/221.1 |
| 5,812,639 A | * | 9/1998 | Bartholomew et al. ..... 370/352 |
| 5,881,132 A | * | 3/1999 | O'Brien et al. ............... 379/35 |
| 5,926,482 A | * | 7/1999 | Christie et al. ............. 370/469 |
| 6,115,380 A | * | 9/2000 | Christie et al. .......... 370/395.3 |
| 6,842,513 B1 | * | 1/2005 | Androski et al. ...... 379/220.01 |

OTHER PUBLICATIONS

MegaHub®STP Point Code Mapping Document No. 071-7501-068, 31 pages, copyrighted 1997.

* cited by examiner

*Primary Examiner*—Harry S. Hong
(74) *Attorney, Agent, or Firm*—Law Office of William J. Tucker; Craig A. Hoersten

(57) ABSTRACT

A signaling transfer point (STP) (or Signaling Server Global (SSG)) is described herein which includes a processor and a mapping database that can depending on the direction of a message change the Origination Point Code (OPC) or the Destination Point Code (DPC) and the Circuit Identification Code (CIC) contained in the message. As such, the STP can receive a message from a foreign switch located in another telecommunications network and redirect the message that was originally destined for an old switch, which is in the process being removed or has been removed, to a new switch which now hosts the trunks previously connected to the old switch. The return traffic from the new switch is also processed by the STP so that when the foreign switch receives the message, it will appear like it originated from the old switch. As a result, the user of the STP can transparently consolidate switches without affecting the SS7 database contained in other carrier networks.

17 Claims, 6 Drawing Sheets

SYSTEM AND METHOD FOR TRANSPARENT CONSOLIDATION OF SWITCHES IN A TELECOMMUNICATIONS NETWORK

BACKGROUND OF THE INVENTION

1. Field of the Invention

The present invention relates in general to the telecommunications field and, in particular, to a signaling transfer point (STP) and a method that allows a carrier to reassign trunks (voice circuits) from one switch to another switch without having to inform any other carrier.

2. Description of Related Art

Today many carriers in the telecommunication field need to replace their old switches with new and improved switches that can better handle the ever increasing traffic loads. And, when a carrier replaces an old switch with a new switch they need to move one end of many the trunks (voice circuits) from the old switch to the new switch. In the past, this caused a problem since the carrier needed to inform a remote carrier that supervises a foreign switch at which the other ends of the trunks are connected about the change so they could update a database in the foreign switch. This resulted in an expense to the carrier that moved the trunks because the remote carrier would charge them for their costs in having to update the database in the foreign switch.

To help address this problem, DSC Communications Corporation now part of Alcatel designed a STP known as MegaHub® STP. The MegaHub® STP has a "point code mapping feature" that allows a carrier to reassign one or more trunks from one switch (old switch) to another switch (new switch) in a manner that another carrier would not need to be informed about the change and thus the other carrier would not need to make any changes in the database at the foreign switch. How the MegaHub® STP does this is described below with respect to the block diagram and flowchart shown in FIGS. 1A and 1B.

As shown in FIGS. 1A and 1B (PRIOR ART), the traditional STP 100 receives (step 102a) a call processing message 110 (e.g., Initial Address Message (IAM) 110) on a Signaling System No. 7 (SS7) link 112 from the foreign switch 108. The foreign switch 108 configured the call processing message 110 so it is supposed to be sent by the traditional STP 100 to the old switch 104. However, the traditional STP 100 does not send the call processing message 110 to the old switch 104. Instead, the traditional STP 100 remaps (step 104b) the call processing message 110 such that the remapped call processing message 114 can be sent over a SS7 link 116 to the new switch 106.

To accomplish this, the traditional STP 100 has a processor 118 and a mapping database 120 that implement software to change a value of a Destination Point Code (DPC) in the call processing message 110 to indicate the new switch 106 (shown as new switch "A") instead of the old switch 104 (shown as old switch "B"). An exemplary message sequence table illustrating how the call processing message 110 can be remapped by the traditional STP 100 is provided below:

| DPC | OPC | CIC |
|-----|-----|-----|
| B | X | 100 → call processing message 110 |
| A | X | 100 → remapped call processing message 114 | where:
- DPC is the Destination Point Code.
- OPC is the Originating Point Code.
- CIC is the Circuit Identification Code.
- B is the old switch 104.
- A is the new switch 106.
- X is the foreign switch 108.

The traditional STP 100 then forwards (step 106b) the remapped call processing message 114 to the new switch 106. Upon receiving the remapped call processing message 114, the new switch 106 seizes (step 108b) the reassigned trunk 102' (shown as "CIC 100") associated with the CIC in the remapped call processing message 114. The new switch 106 then sends (step 110b) another call processing message 122 (Address Complete Message (ACM) 122) to the traditional STP 100. The traditional STP 100 remaps (step 112b) this call processing message 122 such that the remapped call processing message 124 looks like it originated from the old switch 104 instead of the new switch 106.

To accomplish this, the traditional STP 100 and in particular the processor 118 and a mapping database 120 implement software to change a value of the Origination Point Code (OPC) in the call processing message 122 to indicate the old switch 104 (shown as old switch "B") instead of the new switch 106 (shown as new switch "A"). An exemplary message sequence table illustrating how the call processing message 122 can be remapped by the traditional STP 100 is provided below:

| DPC | OPC | CIC |
|-----|-----|-----|
| X | A | 100 → call processing message 122 |
| X | B | 100 → remapped call processing message 124 |

The traditional STP 100 then forwards (step 114b) the remapped call processing message 124 to the foreign switch 108. As can be seen, the foreign switch 108 thinks the trunk 102 is connected to the old switch 104 even though it has been reassigned and is now connected to the new switch 106. After all of this, the foreign switch 108 can established a call using what they believe is the old switch 104 but is in fact the new switch 106. Although the traditional STP 100 works well, it can still be improved so as to give the carrier more flexibility when they reassign and move trunks 102 from the old switch 104 to the new switch 106. An improved STP and method are the subject of the present invention.

BRIEF DESCRIPTION OF THE INVENTION

The present invention includes a STP which has a processor and a mapping database that can depending on the direction of a message change the Origination Point Code (OPC) or the Destination Point Code (DPC) and the Circuit Identification Code (CIC) contained in the message. As such, the STP can receive a message from a foreign switch located in another telecommunications network and redirect the message that was originally destined for an old switch, which is in the process of being removed or has been removed, to a new switch which now hosts the trunks previously connected to the old switch. The return traffic from the new switch is also processed by the STP so that when the foreign switch receives the message, it will appear as if it originated from the old switch. As a result, the user of the STP can transparently consolidate switches without affecting the SS7 database contained in other carrier networks.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 2A:
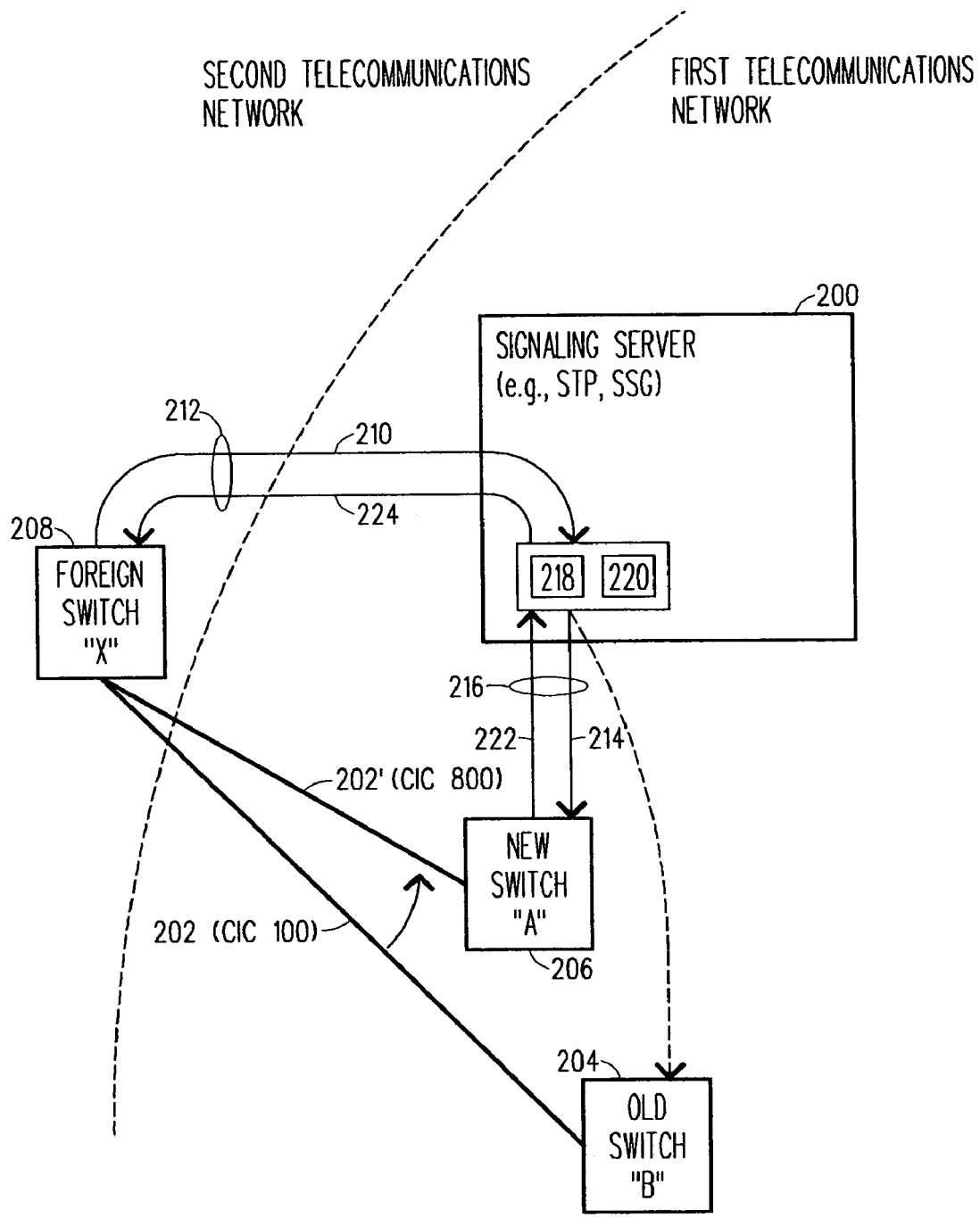
FIGS. 2A and 2B respectively show a block diagram of two telecommunication networks and a flowchart of a method which are used to help describe a point code and CIC mapping feature of a signaling server (e.g., STP, SSG) in accordance with the present invention.
Figure 2B:
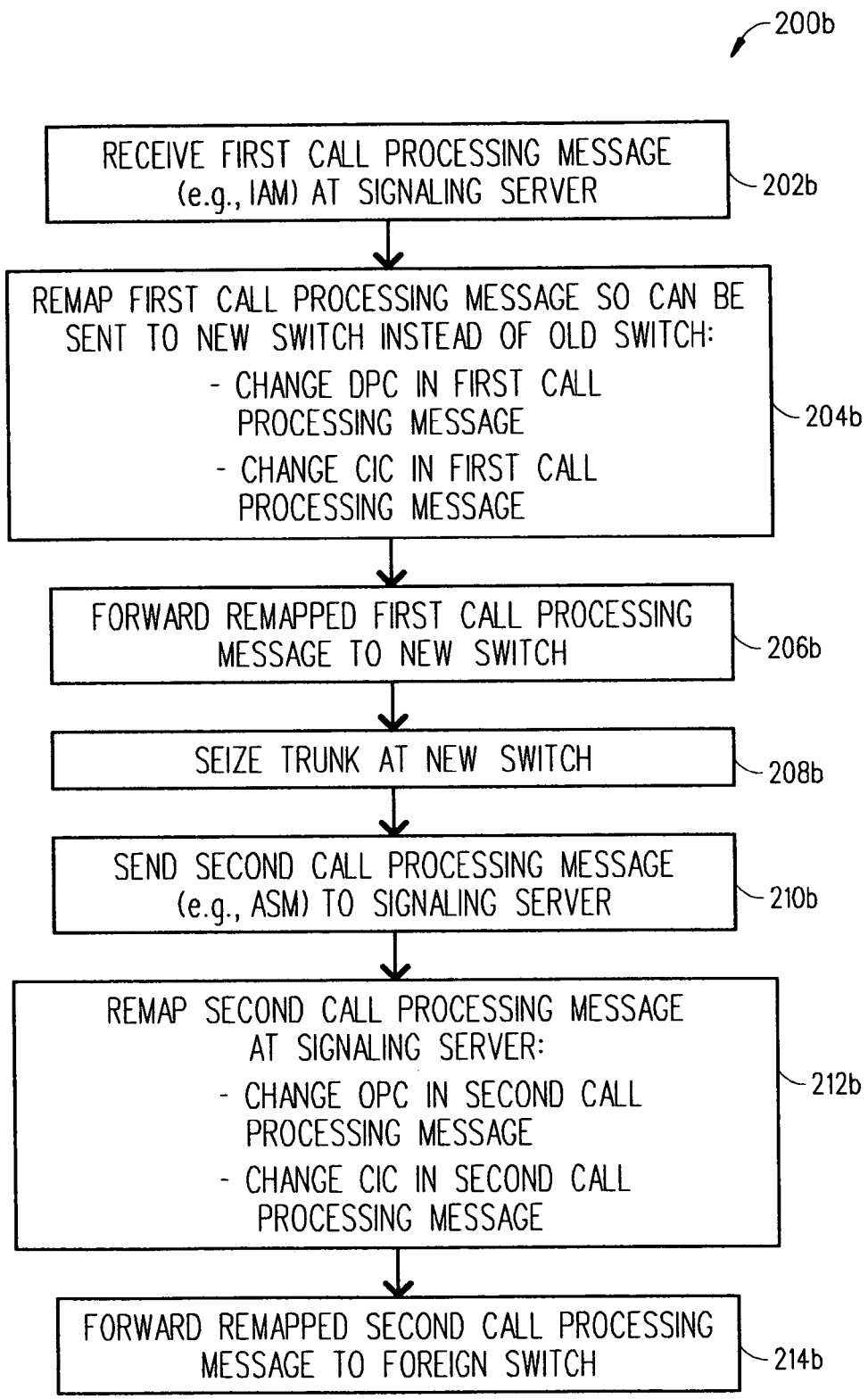

Referring to FIGS. 2A and 2B, there are respectively shown a block diagram of two telecommunication networks and a flowchart of a method 200b which are used to describe how the signaling server 200 (e.g., STP 200, SSG 200) enables a carrier to reassign one end of a trunk 202 from one switch 204 (e.g., old switch 204) to another switch 206 (e.g., new switch 206) without having to inform a remote carrier that supervises a foreign switch 208 which is connected to the other end of the trunk 202. Basically, the STP 200 of the present invention implements a point code and CIC mapping feature where both the point codes and the CICs are mapped instead of just the point codes like is done in the traditional STP 100. The advantage of mapping both the point codes and CICs and how this can be accomplished by the STP 200 are described below with respect to FIGS. 2A and 2B.

As shown, the STP 200 receives (step 202a) a call processing message 210 (e.g., Initial Address Message (IAM) 210) on a SS7 link 212 from the foreign switch 208. The foreign switch 208 configured the call processing message 210 so it is supposed to be sent by the STP 200 to the old switch 204. However, the STP 200 does not send the call processing message 210 to the old switch 204. Instead, the STP 200 remaps (step 204b) the call processing message 210 such that the remapped call processing message 214 can be sent over a SS7 link 214 to the new switch 206.

To accomplish this, the STP 200 has a processor 218 and a mapping database 220 that implement software to change: (1) a value of the DPC in the call processing message 210 to indicate the new switch 206 (shown as new switch "A") instead of the old switch 204 (shown as old "B"); and (2) a value of the CIC to indicate the new trunk 202' (shown as "CIC 800") associated with the new switch 206 instead of the old trunk circuit 202 (shown as "CIC 100") associated with the old switch 204. An exemplary message sequence table illustrating how the call processing message 210 can be remapped by the STP 200 is provided below:

| DPC | OPC | CIC |
|---|---|---|
| B | X | 100 → call processing message 210 |
| A | X | 800 → remapped call processing message 214 | where:
DPC is the Destination Point Code.
OPC is the Originating Point Code.
CIC is the Circuit Identification Code.
B is the old switch 204.
A is the new switch 206.
X is the foreign switch 208.

The STP 200 then forwards (step 206b) the remapped call processing message 214 to the new switch 208. Upon receiving the remapped call processing message 214, the new switch 208 seizes (step 208b) the reassigned trunk 202 (shown as "CIC 800") associated with the CIC in the remapped call processing message 214. The new switch 208 then sends (step 210b) another call processing message 222 (Address Complete Message (ACM) 222) to the STP 200. The STP 200 remaps (step 212b) this call processing message 222 such that the remapped call processing message 224 looks like it originated from the old switch 204 instead of the new switch 206.

To accomplish this, the STP 200 and in particular the processor 218 and a mapping database 220 implement software to change: (1) a value of the OPC in the call processing message 222 to indicate the old switch 204 (shown as old switch "B") instead of the new switch 206 (shown as new switch "A"); and (2) a value of the CIC to indicate the old trunk 202 (shown as "CIC 100") associated with the old switch 204 instead of the new trunk 202' (shown as "CIC 800") associated with the new switch 206. An exemplary message sequence table illustrating how the call processing message 222 can be remapped by the STP 200 is provided below:

| DPC | OPC | CIC |
|---|---|---|
| X | A | 800 → call processing message 122 |
| X | B | 100 → remapped call processing message 124 |

The STP 200 then forwards (step 214b) the remapped call processing message 224 to the foreign switch 208. As can be seen, the foreign switch 208 thinks the trunk 202 is connected to the old switch 204 even though it has be reassigned and is now connected to the new switch 206. After all of this, the foreign switch 208 can established a call with what they believe is the old switch 204 but is in fact the new switch 206.

Figure 1A:
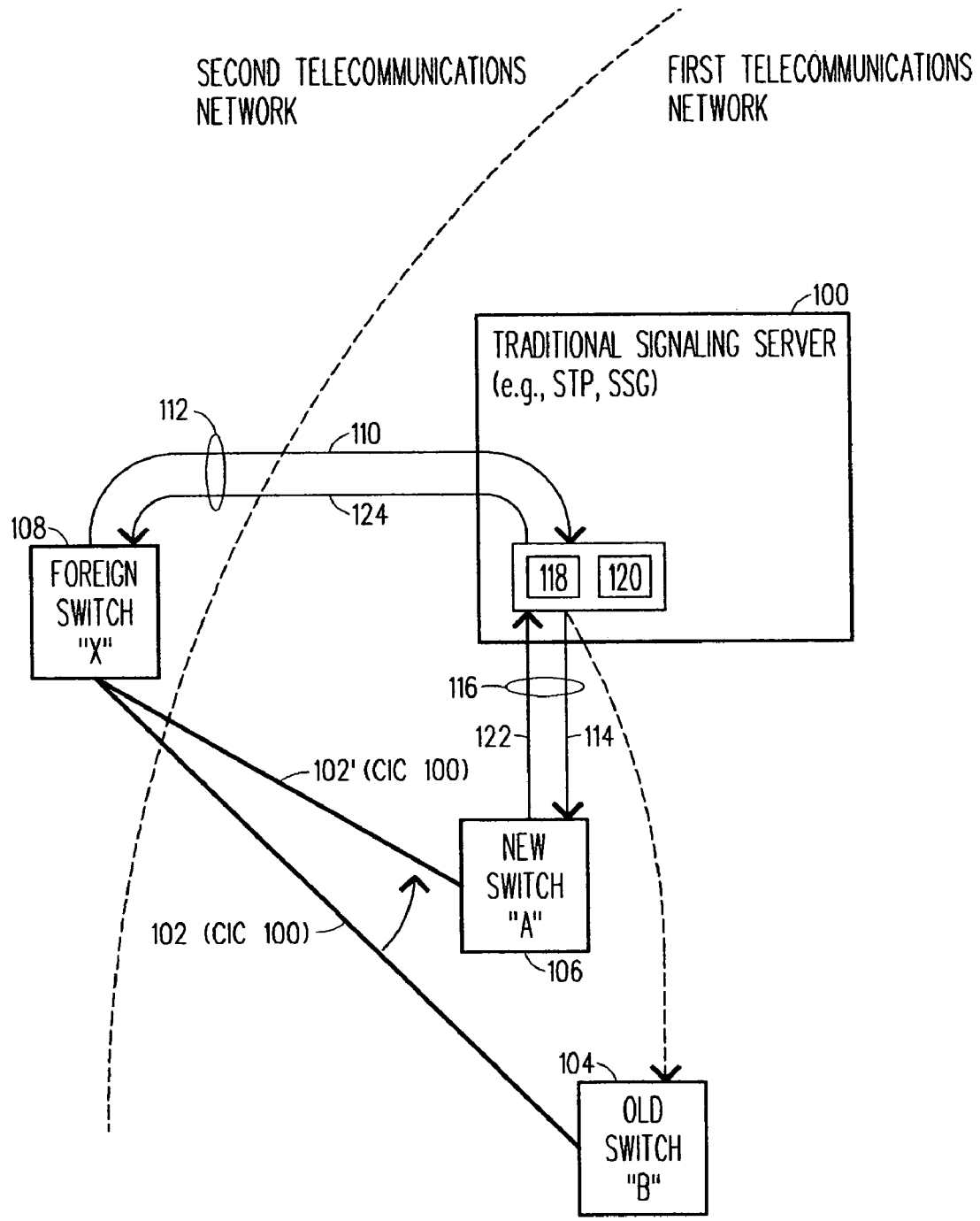
FIGS. 1A and 1B (PRIOR ART) respectively show a block diagram of two telecommunication networks and a flowchart of a method which are used to help describe a point code mapping feature of a traditional signal server.
Figure 1B:
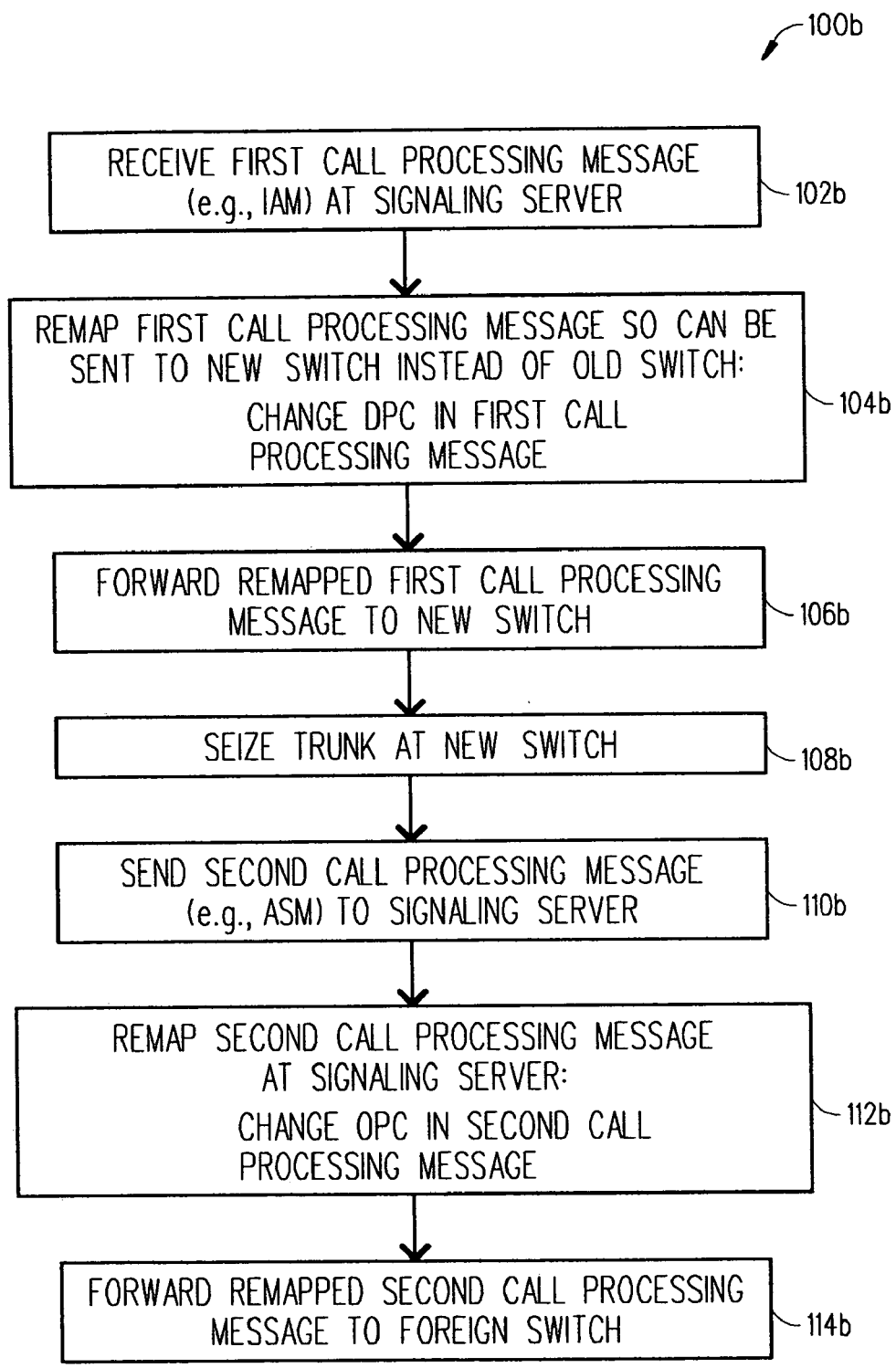

The STP 200 that implements the point code and CIC mapping feature gives the carrier more flexibility with the numbering of the CICs when compared to the traditional STP 100. This flexibility can be seen in FIG. 2A where the carrier was able to renumber the CIC of the trunk 202' connected to the new switch 206 so it was different than the number of the trunk 202 connected to the old switch 204. The renumbering of CICs is not possible with the traditional STP 100 which implements the point code mapping between the old trunk 102 and the new trunk 102' (see FIG. 1A).

Figure 3A:
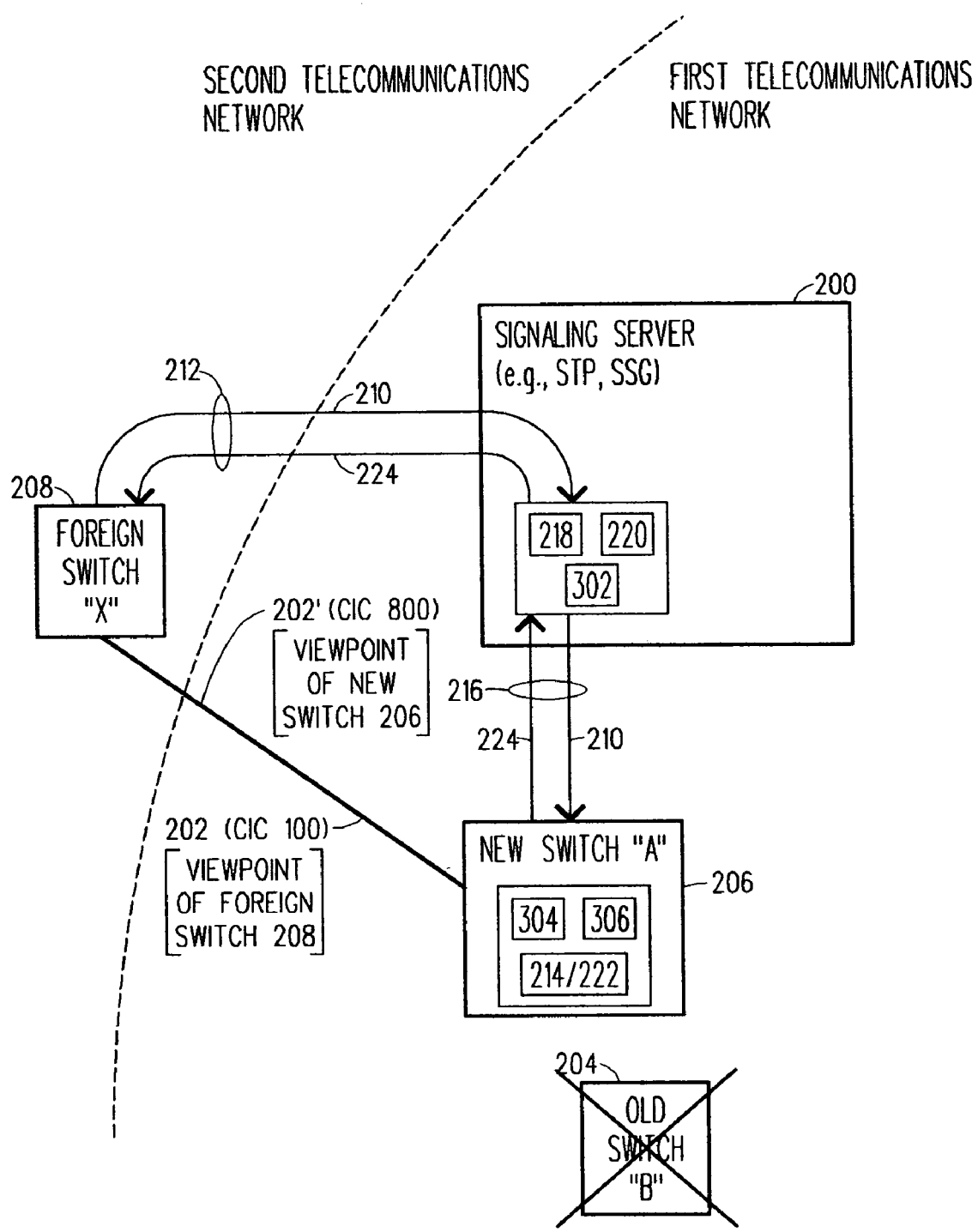
FIGS. 3A and 3B respectively show a block diagram of two telecommunication networks and a flowchart of a method which are used to help describe how a new switch can implement the point code and CIC mapping feature instead of the signal server after consolidation of all of the trunks has been completed from the old switch to the new switch in accordance with another aspect of the present invention.
Figure 3B:
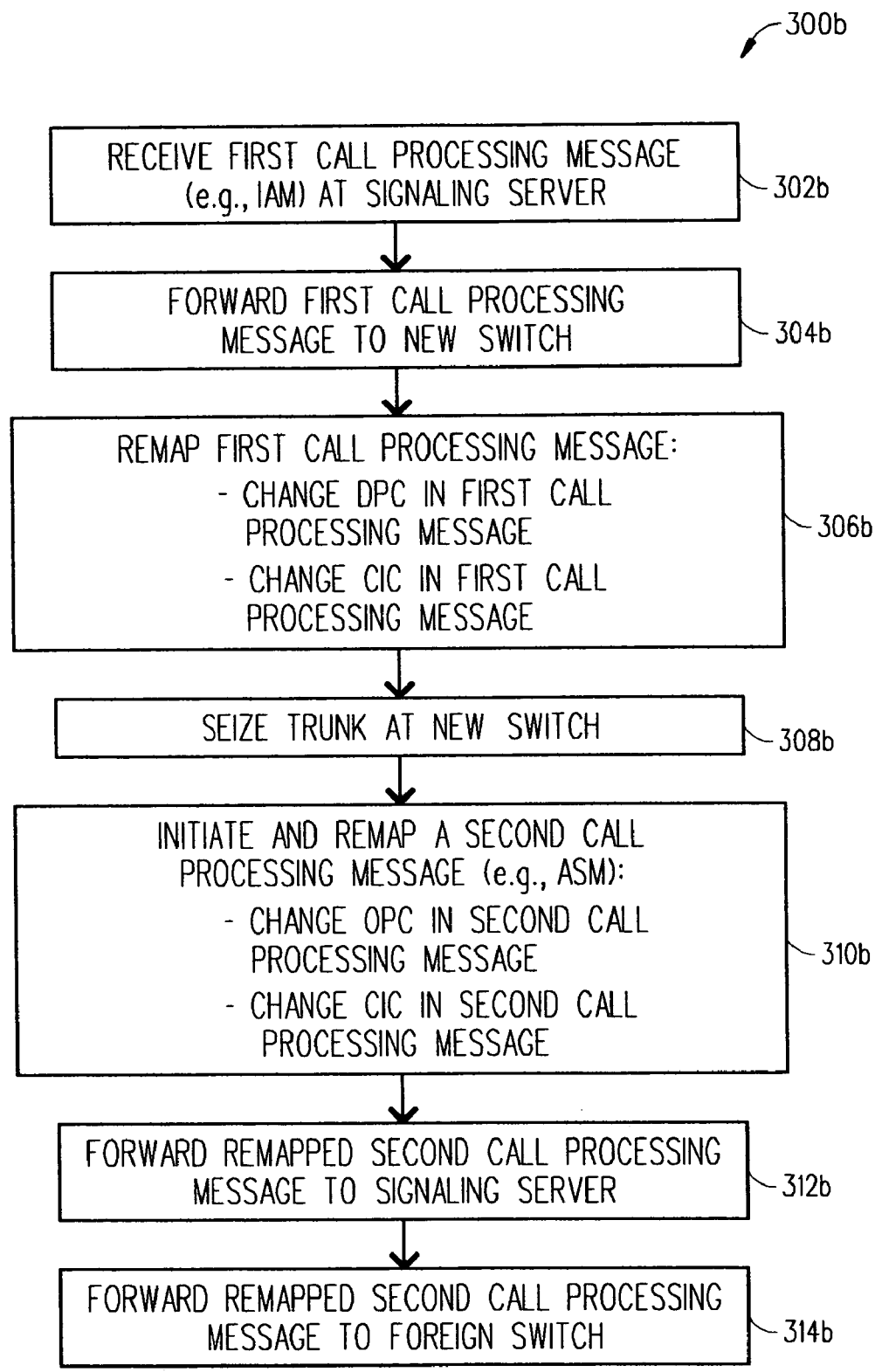

Referring to FIGS. 3A and 3B, there are respectively shown a block diagram of two telecommunication networks and a flowchart of a method 300b which are used to describe how the new switch 206 can implement the point code and CIC mapping feature instead of the signal server 200 after the completion of the consolidation of all of the trunks 202 from the old switch 204 to the new switch 206. This is important since once the carrier has reassigned/consolidated all of the trunks 202 to the new switch 206 and removed the old switch 204, it would be beneficial if the new switch 206 implemented the point code and CIC mapping feature to reduce the processing duties of the STP 200. How this can be accomplished is described below with respect to FIGS. 2A and 2B.

As shown, the STP 200 receives (step 302a) a call processing message 210 (e.g., Initial Address Message (IAM) 210) on a SS7 link 212 from the foreign switch 208. The foreign switch 208 configured the call processing message 210 so it is supposed to be sent by the STP 200 to the old switch 204. However, the STP 200 after checking a SS7 routing table 302 directs (step 304b) the call processing message 210 to the new switch 206. The new switch 206 remaps (step 306b) the call processing message 210 to create the remapped call processing message 214. To accomplish this, the new switch 206 has a processor 304 and a mapping database 306 that implement software to change: (1) a value of the DPC in the call processing message 210 to indicate the new switch 206 (shown as new switch "A") instead of the old switch 204 (shown as old switch "B1"); and (2) a value of a CIC to indicate the new trunk 202' (shown as "CIC 800") associated with the new switch 206 instead of the old trunk 202 (shown as "CIC 100") associated with the old switch 204. An exemplary message sequence table illustrating how the call processing message 210 can be remapped by the new switch 206 is provided below:

| DPC | OPC | CIC |
|-----|-----|-----|
| B | X | 100 → call processing message 210 |
| A | X | 800 → remapped call processing message 214 | where:
DPC is the Destination Point Code.
OPC is the Originating Point Code.
CIC is the Circuit Identification Code.
B is the old switch 204.
A is the new switch 206.
X is the foreign switch 208.

The message is then processed by the call processing software on the new switch (as if the STP had performed the mapping as before). At this point, the new switch 206 seizes (step 308b) the reassigned trunk 202' (shown as "CIC 800") associated with the CIC in the remapped call processing message 214. The new switch 206 then creates and remaps (step 310b) another call processing message 222 (Address Complete Message (ACM) 222) such that the remapped call processing message 224 looks like it originated from the old switch 204 instead of the new switch 206. To accomplish this, the new switch 206 and in particular the processor 304 and the mapping database 306 implement software to change: (1) a value of the OPC in the call processing message 222 to indicate the old switch 204 (shown as old switch "B") instead of the new switch 206 (shown as new switch "A"); and (2) a value of the CIC to indicate the old trunk 202 (shown as "CIC 100") associated with the old switch 204 instead of the new trunk 202' (shown as "CIC 800") associated with the new switch 206. An exemplary message sequence table illustrating how the call processing message 222 can be remapped by the new switch 206 is provided below:

| DPC | OPC | CIC |
|-----|-----|-----|
| X | A | 800 → call processing message 122 |
| X | B | 100 → remapped call processing message 124 |

The new switch 206 then forwards (step 312b) the remapped call processing message 224 to the STP 200. The STP 200 then forwards (step 314b) the remapped call processing message 224 to the foreign switch 208. As can be seen, the foreign switch 208 thinks the trunk 202 is connected to the old switch 204 even though it has been reassigned and is now connected to the new switch 206. After all of this, the foreign switch 208 can established a call using what they believe to be the old switch 204 but is in fact the new switch 206.

Following are some features, advantages and uses of the present invention:

It should be appreciated that the carrier can use the point code and CIC mapping feature of the present invention to help them consolidate or reassign multiple trunks 202 from the old switch 204 to the new switch 206 instead of just one trunk 202 as shown and described above in FIGS. 2–3.

The STP 200 can be a Signal Transfer Point (STP) or a Signaling Server Global (SSG) or any other network element performing the STP function.

The STP 200 and methods 200b and 300b allow a carrier to reduce costs associated with coordination of point code and circuit assignments with other carriers.

It should be appreciated that many components and details associated with the STP 200, the old switch 204 and the new switch 206 described above are well known in the industry. Therefore, for clarity, the description provided above omitted those well known components and details that are not necessary to understand the present invention.

Although two embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:
1. A signaling transfer point comprising:
a processor; and
a mapping database, wherein said processor and said mapping database perform the following steps:
receiving a call processing message originated by a foreign switch;
remapping the call processing message so the remapped call processing message can be sent to a new switch instead of an old switch by performing the following steps:
changing a value of a Destination Point Code (DPC) in the call processing message to indicate the new switch instead of the old switch; and
changing a value of a Circuit Identification Code (CIC) in the call processing message to indicate a new trunk associated with the new switch instead of an old trunk associated with the old switch; and forwarding the remapped call processing message to the new switch, wherein the foreign switch is not informed that the call processing message was remapped and forwarded to the new switch.

2. The signaling transfer point of claim 1, wherein said processor receives a second call processing message from the new switch and then said processor and said mapping database perform the following steps:

remapping the second call processing message by performing the following steps:

changing a value of an Origination Point Code (OPC) in the second call processing message to indicate the old switch instead of the new switch; and changing a value of a Circuit Identification Code (CIC) in the second call processing message to indicate the old trunk associated with the old switch instead of the new trunk associated with the new switch; and forwarding the remapped second call processing message to the foreign switch.

3. The signaling transfer point of claim 2, wherein:

said call processing message is an Initial Address Message (IAM); and said second call processing message is an Address Complete Message (ACM).

4. The signaling transfer point of claim 1, wherein:

said old switch and new switch are associated with a first telecommunications network; and said foreign switch is associated with a second telecommunications network.

5. The signaling transfer point of claim 1, wherein said new switch performs the remapping step instead of said processor and said mapping database after consolidation of all of the trunks is completed from said old switch to said new switch.

6. A method implemented within a signaling transfer point while consolidating trunks from an old switch to a new switch that are both located in a first telecommunications network, said method comprising the steps of:

receiving a call processing message from a foreign switch located in a second telecommunications network;

remapping the call processing message so the remapped call processing message can be sent to the new switch instead of the old switch by performing the following steps:

changing a value of a Destination Point Code (DPC) in the call processing message to indicate the new switch instead of the old switch; and changing a value of a Circuit Identification Code (CIC) in the call processing message to indicate a new trunk associated with the new switch instead of an old trunk associated with the old switch; and forwarding the remapped call processing message to the new switch, wherein the foreign switch is not informed that the call processing message was remapped and forwarded to the new switch.

7. The method of claim 6, wherein said signaling transfer point also implements the following steps:

receiving a second call processing message from the new switch;

remapping the second call processing message by performing the following steps:

changing a value of an Origination Point Code (OPC) in the second call processing message to indicate the old switch instead of the new switch; and changing a value of a Circuit Identification Code (CIC) in the second call processing message to indicate the old trunk associated with the old switch instead of the new trunk associated with the new switch; and forwarding the remapped second call processing message to the foreign switch.

8. The method of claim 7, wherein:

said call processing message is an Initial Address Message (IAM); and said second call processing message is an Address Complete Message (ACM).

9. The method of claim 6, wherein said new switch performs the remapping step instead of said signaling transfer point after consolidation off all of the trunks is completed from said old switch to said new switch.

10. A telecommunications network comprising:

a new switch;

an old switch; and a signaling transfer point, wherein said signaling transfer point performs the following steps:

receiving a call processing message from a foreign switch located in another telecommunications network;

remapping the call processing message such that the remapped call processing message can be sent to the new switch instead of the old switch by performing the following steps:

changing a value of a Destination Point Code (DPC) in the call processing message to indicate the new switch instead of the old switch; and changing a value of a Circuit Identification Code (CIC) in the call processing message to indicate a new trunk associated with the new switch instead of an old trunk associated with the old switch; and forwarding the remapped call processing message to the new switch, wherein the foreign switch is not informed that the call processing message was remapped and forwarded to the new switch.

11. The telecommunications network of claim 10, wherein said signaling transfer point also performs the following steps:

receiving a second call processing message from the new switch;

remapping the second call processing message by performing the following steps:

changing a value of an Origination Point Code (OPC) in the second call processing message to indicate the old switch instead of the new switch; and changing a value of a Circuit Identification Code (CIC) in the second call processing message to indicate the old trunk associated with the old switch instead of the new trunk associated with the new switch; and forwarding the remapped second call processing message to the foreign switch.

12. The telecommunications network of claim 11, wherein:

said call processing message is an Initial Address Message (IAM); and said second call processing message is an Address Complete Message (ACM).

13. The telecommunications network of claim 10, wherein said new switch performs the remapping step instead of said signaling transfer point after consolidation off all of the trunks is completed from said old switch to said new switch.

14. A method implemented within a signaling transfer point and a new switch after completing the consolidation of trunks from an old switch to the new switch that are both located in a first telecommunications network, said method comprising the steps of:

receiving, at the signaling transfer point, a first call processing message from a foreign switch located in a second telecommunications network;

forwarding, from the signaling transfer point, the first call processing message to the new switch which performs the following steps:

remapping the first call processing message by:

changing a value of a Destination Point Code (DPC) in the first call processing message to indicate the new switch instead of the old switch; and changing a value of a Circuit Identification Code (CIC) in the first call processing message to indicate a new trunk associated with the new switch instead of an old trunk associated with the old switch;

seizing the new trunk;

initiating a second call processing message and remapping the second call processing message by performing the following steps:

changing a value of an Origination Point Code (DPC) in the second call processing message to indicate the old switch instead of the new switch; and changing a value of a Circuit Identification Code (CIC) in the second call processing message to indicate the old trunk associated with the old switch instead of the new trunk associated with the new switch; and forwarding the remapped second call processing message to the signaling transfer point which forwards the remapped second call processing message to the foreign switch.

15. The method of claim 14, wherein:

said first call processing message is an Initial Address Message (IAM); and said second call processing message is an Address Complete Message (ACM).

16. A telecommunications network comprising:

a new switch;

an old switch; and a signaling transfer point, wherein said signaling transfer point and a new switch implement the following steps:

receiving, at the signaling transfer point, a first call processing message from a foreign switch located in a second telecommunications network;

forwarding, from the signaling transfer point, the first call processing message to the new switch which performs the following steps:

remapping the first call processing message by:

changing a value of a Destination Point Code (DPC) in the first call processing message to indicate the new switch instead of the old switch; and changing a value of a Circuit Identification Code (CIC) in the first call processing message to indicate a new trunk associated with the new switch instead of an old trunk associated with the old switch;

seizing the new trunk;

initiating a second call processing message and remapping the second call processing message by performing the following steps:

changing a value of an Origination Point Code (DPC) in the second call processing message to indicate the old switch instead of the new switch; and changing a value of a Circuit Identification Code (CIC) in the second call processing message to indicate the old trunk associated with the old switch instead of the new trunk associated with the new switch; and forwarding the remapped second call processing message to the signaling transfer point which forwards the remapped second call processing message to the foreign switch.

17. The telecommunications network of claim 15, wherein:

said first call processing message is an Initial Address Message (IAM); and said second call processing message is an Address Complete Message (ACM).

* * * * *